(12) United States Patent
Gonzalez-Banos et al.

(10) Patent No.: US 7,095,487 B2
(45) Date of Patent: Aug. 22, 2006

(54) SYSTEMS AND METHODS FOR DETERMINING DEPTH USING SHUTTERED LIGHT PULSES

(75) Inventors: Hector H. Gonzalez-Banos, Mountain View, CA (US); James E. Davis, Woodside, CA (US)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 10/964,334

(22) Filed: Oct. 12, 2004

(65) Prior Publication Data
US 2005/0280801 A1 Dec. 22, 2005

Related U.S. Application Data

(60) Provisional application No. 60/510,198, filed on Oct. 9, 2003.

(51) Int. Cl.
*G01C 3/00* (2006.01)
*G04D 7/00* (2006.01)

(52) U.S. Cl. .................. 356/4.07; 356/3.13; 73/1.42

(58) Field of Classification Search ............... 356/3.13, 356/4.01–4.05, 4.07, 5.01, 5.07, 5.08, 6; 73/1.42, 1.56; 352/204
See application file for complete search history.

(56) References Cited

U.S. PATENT DOCUMENTS

| | | | |
|---|---|---|---|
| 3,971,065 A | 7/1976 | Bayer | |
| 6,057,909 A | 5/2000 | Yahav et al. | |
| 6,323,942 B1 | 11/2001 | Bamji | |
| 6,331,911 B1 | 12/2001 | Manassen et al. | |
| 6,548,807 B1 * | 4/2003 | Becht | 250/229 |
| 6,734,450 B1 * | 5/2004 | Kakiuchi et al. | 250/559.38 |
| 6,819,436 B1 * | 11/2004 | Ono | 356/614 |
| 2003/0025821 A1 * | 2/2003 | Bean et al. | 348/345 |
| 2003/0206653 A1 * | 11/2003 | Katayama et al. | 382/154 |

OTHER PUBLICATIONS

3DV Systems, *Products: Zmini-A Real-time RGBD Developer's Evaluation Kit*, [online][Retrieved on Oct. 4, 2004] Retrieved from the Internet<URL:http://www.3dvsystems.com/products/zmini.html>.

3DV Systems, *Zmini Data Sheet*, [online][Retrieved on Oct. 4, 2004] Retrieved from the Internet <URL:http://www.3dvsystems.com/products/Zmini/Zmini%20Data%20Sheet.pdf>.

(Continued)

*Primary Examiner*—Thomas H. Tarcza
*Assistant Examiner*—Isam Alsomiri
(74) *Attorney, Agent, or Firm*—Fenwick & West LLP; Mark E. Duell

(57) ABSTRACT

Systems and methods are presented that use light sensors and computing devices to compute the depth of an object using shuttered light pulses. In one embodiment, depth is determined as follows: A light emitter emits a pulse of light that is directed toward an object. The pulse is reflected off the object and travels toward a beam splitter. The beam splitter splits the reflected pulse into multiple pulses, with each pulse directed to a shuttered sensor with a different shutter location. The shuttered sensors measure the integrated intensity of the light, and these values are used to determine the depth of the object. A method is presented which calibrates a system that has an arbitrary number of shutters and enables the system to determine the depth of an object, even in the presence of ambient illumination and scattered light.

11 Claims, 2 Drawing Sheets

OTHER PUBLICATIONS

3DV Systems, *Products: ZCam™ add-on*, [online][Retrieved on Oct. 4, 2004] Retrieved from the Internet <URL:http://www.3dvsystems.com/products/products.html#zcam>.

3DV Systems, *Products: DMC100—A Compact Depth Machine Camera*, [online][Retrieved on Oct. 4, 2004] Retrieved from the Internet <URL:http://www.3dvsystems.com/products/products.html#dmc100>.

Davis, J. et al., Enhanced Shape Recovery With Shuttered Pulses of Light, *IEEE Workshop on Projector-Camera Systems*, 2003.

González-Baños, H. et al., Computing Depth Under Ambient Illumination Using Multi-Shuttered Light, *Proceedings of the 2004 IEEE Computer Society Conference on Computer Vision and Pattern Recognition (CVPR)*, Washington, D.C., Jun. 27-Jul. 2, 2004, pp. 234-241.

Gvili, R. et al., Depth Keying, *SPIE Electronic Imaging Conference*, 2003.

Iddan, G. et al., 3D Imaging in the Studio, *Proc. Of SPIE Videometrics and Optical Methods for 3D Shape Measurement*, SPIE Vol. 4298, 2001, pp. 48-55.

Kawakita, M. et al., High-Definition Three-Dimension Camera: HDTV Version of an Axi-Vision Camera, *NHK Laboratories Note*, No. 479, Aug. 2002, pp. 1-12.

Kawakita, M. et al., Axi-Vision Camera (Real-Time Distance-Mapping Camera), *Applied Optics*, Opt. Soc. America, vol. 39, No. 22, Aug. 2000, pp. 3931-3939.

Lange, R. et al., Solid-State Time-of-Flight Range Camera, *IEEE Journal of Quantum Electronics*, vol. 37, No. 3, Mar. 2001.

Miyagawa, R. et al., CCD-Based Range-Finding Sensor, *IEEE Transactions on Electron Devices*, vol. 44, No. 10, Oct. 1997, pp. 1648-1652.

Schroeder, W. et al., Scannerless Laser Range Camera, *Sensor Review*, MCB University Press, vol. 19, No. 4, 1999, pp. 285-291.

Anteryon B.V., *Data Sheet*: LCP 250 Fast Scattering Liquid Crystal Polymer Shutter, Netherlands, 2002.

PCT International Search Report and Written Opinion; PCT/US04/33974, May 15, 2006.

* cited by examiner

FIG. 2

SYSTEMS AND METHODS FOR DETERMINING DEPTH USING SHUTTERED LIGHT PULSES

CROSS-REFERENCE TO RELATED APPLICATION

This application claims priority from the following U.S. provisional patent application, which is hereby incorporated by reference: Ser. No. 60/510,198, filed on Oct. 9, 2003, entitled "Enhanced Shape Recovery with Shuttered Pulses of Light."

BACKGROUND OF THE INVENTION

1. Field of the Invention

The present invention relates to using light sensors and computing devices to compute the depth of a scene. More particularly, the present invention relates to using light sensors and computing devices to compute the depth of a scene using shuttered light pulses.

2. Description of Background Art

The fields of optical range finding and optical range imaging are concerned with using light to determine the depth of a scene. Approaches that use light to determine the depth of a scene include interferometry, triangulation, phase shift measurement, and time-of-flight measurement. Interferometry techniques calculate the interference patterns caused by combining two beams of coherent, monochromatic light that have reflected off of an object. Triangulation techniques calculate a disparity map of a scene based on images of the scene generated from two viewpoints. Phase shift measurement techniques calculate the phase shift between a beam of intensity modulated light and that same beam after it has reflected off of an object.

Direct time-of-flight (TOF) techniques measure the time it takes a beam of light to travel from its source to the scene and back. Since light travels at a constant speed, once the TOF is known, the distance to an object can be determined. A TOF technique generally uses a short pulse of light. A light sensor is used to detect the arrival of the reflected light. TOF can be measured directly by using a clock to determine the amount of time that elapsed between when a beam was emitted and when its reflection arrived.

TOF can also be measured indirectly by analyzing the intensity of the reflected beam over time. This technique is known as "photon-counting." Since light reflected from closer objects returns before light reflected from farther objects, knowing the intensity of the reflected beam over time enables scene distances to be determined. A light sensor can measure the amount of light that has hit it (known as "integrated light"), which is determined by the intensity of the light and its duration. One way to measure this quantity over time is by controlling when a light sensor can sense light (known as "shuttering" the light). Shuttering varies the integration time of the sensor and can yield a set of time-sampled values, which represent the intensity of the reflected beam over time. For example, if a light sensor stops sensing light before all of the incoming light has arrived, it will have captured more light from closer objects and less light from farther objects. As a result, nearby objects will appear to be bright, while farther objects will appear to be dim. This technique is known as shuttered light-pulse (SLP) ranging or SLP imaging and relies on the fact that the depth of an object is proportional to the amount of integrated light measured by a sensor.

Although the amount of integrated light measured by a sensor depends on the depth of an object, it also depends on several other factors, including the object's reflectivity, the amount of ambient illumination, and light scattering. An object's reflectivity, known more generally as "albedo," represents the fraction of incidental light that is reflected by the object and varies based on the object's color and texture. Ambient illumination represents the amount of ambient light that is incident to the shuttered sensor. Light scattering is caused by shutter imperfections, which enable a shuttered sensor to sense light, even if the shutter is closed.

In general, in order to solve for each unknown value of a factor, a measurement from at least one independent shutter location is required. For example, in order to determine the depth of an object while also accounting for the object's albedo, measurements from at least two independent shutter locations are required. In addition, each sensor must be calibrated. Once the above-mentioned measurements have been obtained, they are used to determine the depth of the object. Existing SLP techniques do not adequately calibrate sensors and manipulate the above-mentioned measurements, especially when more than two shutter locations are used. As a result, the calculated scene depth is often incorrect.

What is needed is a shuttered light-pulse technique that adequately calibrates sensors and manipulates the above-mentioned measurements.

SUMMARY OF THE INVENTION

Systems and methods are presented that use light sensors and computing devices to compute the depth of an object using shuttered light pulses. In one embodiment, depth is determined as follows: A light emitter emits a pulse of light that is directed toward an object. The pulse is reflected off the object and travels toward a light sensor. The sensor is shuttered so that it senses the light for a specific period of time.

A plurality of integrated intensity measurements $I_i$ are obtained from a plurality of shutter locations. These measurements are then used to determine the depth of the object based on the following expression:

$$\frac{a_0 + a_1 I_1 + a_2 I_2 + \ldots a_n I_n}{b_0 + b_1 I_1 + b_2 I_2 + \ldots b_n I_n},$$

where $a_0, a_1, \ldots, a_n$ and $b_0, b_1, \ldots, b_n$ are calibration parameters.

In one embodiment, $a_0, a_1, \ldots a_n$ and $b_0, b_1, \ldots, b_n$ are determined as follows: A calibration dataset is assembled by placing a target object at a known depth r and obtaining integrated intensity measurements $I_1, I_2, \ldots, I_n$ (forming a row-vector Y) from multiple shutter locations. This procedure is then repeated one or more times (forming a row-vector r), varying the value of a factor that affects integrated intensity (such as depth, albedo, ambient illumination, or light scattering). These measurements are then used to determine $a_0, a_1, \ldots, a_n$ and $b_0, b_1, \ldots, b_n$ based on the following expression:

$$\left( \begin{bmatrix} 1 & Y_1 & -r_1 Y_1 \\ 1 & Y_2 & -r_2 Y_2 \\ 1 & Y_3 & -r_3 Y_3 \\ \vdots & \vdots & \vdots \\ 1 & Y_m & -r_m Y_m \end{bmatrix}^T \begin{bmatrix} 1 & Y_1 & -r_1 Y_1 \\ 1 & Y_2 & -r_2 Y_2 \\ 1 & Y_3 & -r_3 Y_3 \\ \vdots & \vdots & \vdots \\ 1 & Y_m & -r_m Y_m \end{bmatrix} \right)^{-1} \begin{bmatrix} 1 & Y_1 & -r_1 Y_1 \\ 1 & Y_2 & -r_2 Y_2 \\ 1 & Y_3 & -r_3 Y_3 \\ \vdots & \vdots & \vdots \\ 1 & Y_m & -r_m Y_m \end{bmatrix}^T r$$

BRIEF DESCRIPTION OF THE DRAWINGS

The invention is illustrated by way of example, and not by way of limitation, in the figures of the accompanying drawings in which like reference numerals refer to similar elements.

FIG. 2 illustrates a block diagram of an arrangement of shuttered sensors that have different shutter locations, according to one embodiment of the invention.

DETAILED DESCRIPTION OF THE EMBODIMENTS

Figure 1:
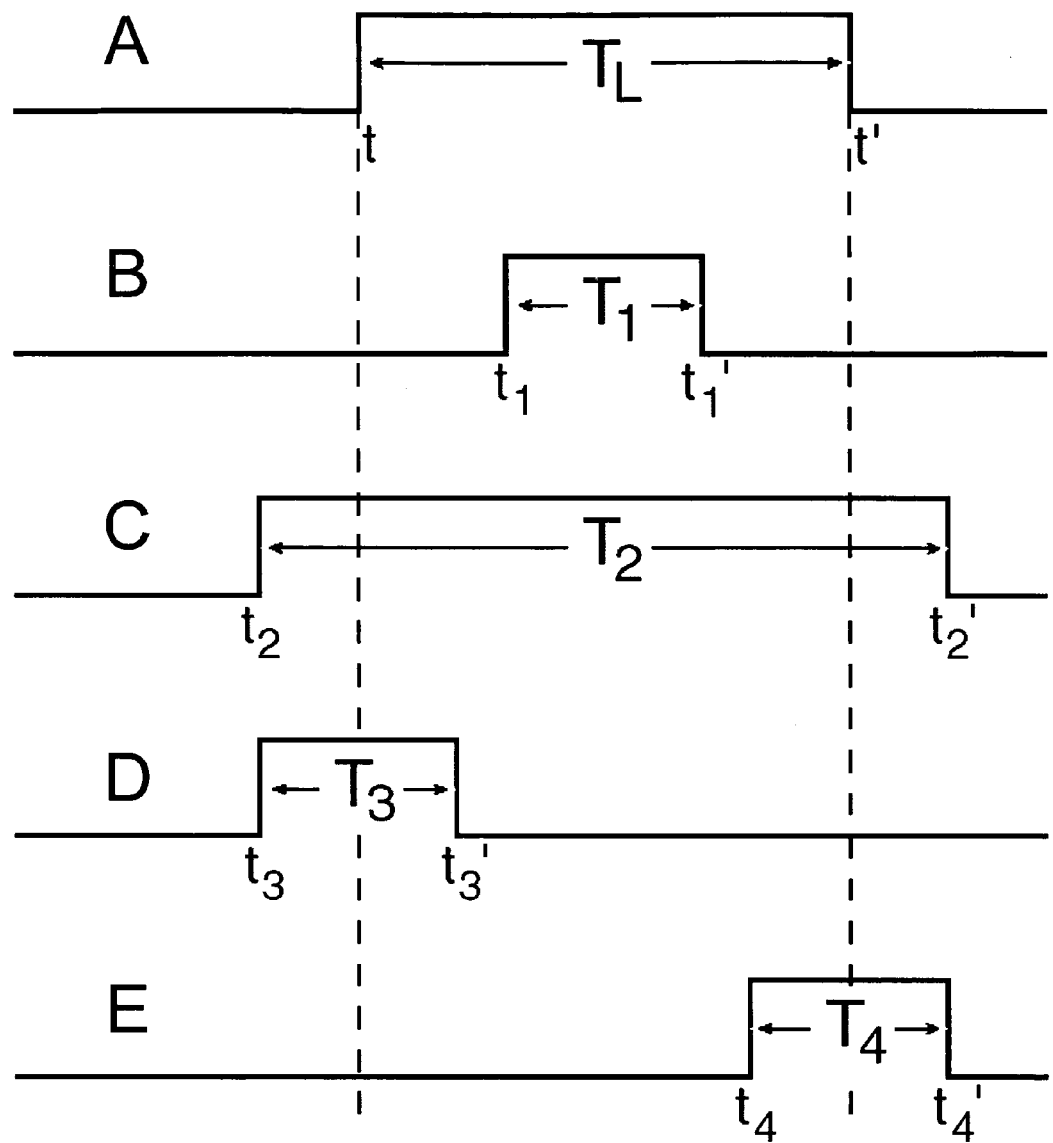
FIG. 1 illustrates a diagram of an incoming light pulse and four categories of shutter locations, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Overview of Technique for Computing the Depth of an Object Using Shuttered Light Pulses The depth of an object (e.g., the distance between the object and a light sensor) can be determined by analyzing, over time, the intensity of a light beam that has bounced off of the object. Integrated intensity measurements from independent shutter locations are used to determine the object's depth while also accounting for other factors, such as the object's albedo, the amount of ambient illumination, and the imperfection of shutters.

A shutter "location" refers to the time during which a shuttered light sensor can sense an incoming light pulse. Shutter locations fall into four categories based on when they allow a shuttered sensor to sense the incoming light pulse: surrounding shutter, head shutter, middle shutter, and tail shutter. FIG. 1 illustrates a diagram of an incoming light pulse and four categories of shutter locations, according to one embodiment of the invention. For Parts A–E, the horizontal axis represents time, while the vertical axis represents the presence (or absence) of light. Part A shows an incoming light pulse with a duration of $T_L$ whose head arrives at a sensor at time t and whose tail arrives at the same sensor at time t'. Part B shows a middle shutter that has a duration of $T_1$ ($T_1 < T_L$) and enables a shuttered sensor to sense the incoming light pulse from Part A from time $t_1$ ($t_1 > t$) to time $t_1'$ ($t_1' < t'$). Part C shows a middle shutter that has a duration of $T_2$ ($T_2 > T_L$) and enables a shuttered sensor to sense the incoming light pulse from Part A from time $t_2$ ($t_2 < t$) to time $t_2'$ ($t_2' > t'$). Part D shows a head shutter that has a duration of $T_3$ and enables a shuttered sensor to sense the incoming light pulse from Part A from time $t_3$ ($t_3 < t$) to time $t_3'$ ($t_3' < t'$). Part E shows a tail shutter that has a duration of $T_4$ and enables a shuttered sensor to sense the incoming light pulse from Part A from time $t_4$ ($t_4 > t$) to time $t_4'$ ($t_4' > t'$).

If r represents the depth of an object, then r is a function of the integrated intensity measurements $I_i$ from each shutter location i. If there are n shutter locations ($n \geq 1$), then $r = r(I_1, I_2, \ldots, I_n)$. In one embodiment, $r(I_1, I_2, \ldots, I_n)$ is a linear combination of integrated intensity measurements from n shutter locations divided by a different linear combination of integrated intensity measurements from the same n shutter locations:

$$r = \frac{a_0 + a_1 I_1 + a_2 I_2 + \ldots a_n I_n}{b_0 + b_1 I_1 + b_2 I_2 + \ldots b_n I_n}, \quad \text{(Equation 1)}$$

where $a_i$ and $b_i$ are calibration parameters for shutter location i.

Using row-vector notation, the above equation can be expressed as:

$$r = \frac{a \cdot [1, Y]}{b \cdot [1, Y]}, \quad \text{(Equation 2)}$$

where Y represents $[I_1, I_2, \ldots, I_n]$ (a row-vector of integrated intensity measurements from n shutter locations), a represents $[a_1, a_2, \ldots, a_n]$ (a first row-vector of calibration parameters for n shutter locations), and b represents $[b_1, b_2, \ldots, b_n]$ (a second row-vector of calibration parameters for n shutter locations). In one embodiment, a and b represent the overall effects of several factors on integrated intensity measurements and are constant across all pixels and across all depths.

Together, a and b form a calibration row vector [a, b]. Once this calibration vector is known, the above equation can be used to determine the depth of an object. The procedure that is used to obtain these parameters will be described below.

2. System for Computing the Depth of an Object Using Shuttered Light Pulses

As described above, integrated intensity measurements from independent shutter locations can be used to determine an object's depth. These measurements can be obtained using many types of systems. In one embodiment, the system comprises a Zmini camera unit or a ZCam™ camera unit sold by 3DV Systems of Santa Clara, Calif.

In general, a system includes a light emitter and a shuttered light sensor. A light emitter emits a beam of light. In one embodiment, the beam is a pulse. The pulse can be of any shape, such as a square, a linearly increasing or decreasing ramp, or a sinusoid. A light emitter can include, for example, one or more lasers, such as Class I lasers.

A light sensor senses light and includes a photosensitive element such as, for example, a Charge Coupled Device (CCD) or a Complementary Metal Oxide Semiconductor (CMOS). A shuttered light sensor senses light for a specific period of time. In addition, this period of time can be controlled by a user.

One way to shutter a sensor is to place a physical barrier (known as a shutter or mask) between the sensor and the incoming light pulse. When the shutter is open, the sensor senses light. When the shutter is closed, the sensor senses no light (or approximately no light). In order to measure depth within a range of a few meters, shutters and light pulses must have durations on the order of nanoseconds. Although mechanical shutters exist, electronic shutters are usually used in SLP applications because they can open and close much more quickly. For example, a solid-state device such as a liquid crystal polymer (LCP) can be used as a shutter. Another way to shutter a light sensor is to activate it and inactivate it at specific times. This technique, which is known as time-gating, can be thought of as using a virtual or simulated shutter, rather than a physical one.

A system that includes a light emitter and a shuttered light sensor can be used to obtain one integrated intensity measurement (from one shutter location) or a plurality of integrated intensity measurements (from a plurality of shutter locations). A plurality of integrated intensity measurements might be desired, for example, in order to account for the effects of other factors such as ambient illumination.

In one embodiment, in order to obtain one integrated intensity measurement from one shutter location, the system operates as follows: The light emitter emits a pulse of light that is directed toward the object. The pulse is reflected off the object and travels toward a shuttered light sensor. The sensor is shuttered so that it senses the light for a specific period of time.

In one embodiment, in order to obtain a plurality of integrated intensity measurements from a plurality of shutter locations, one or more additional shuttered sensors (with different shutter locations) are added to the system. These additional sensors would sense the same reflected pulse but at different times, due to their different locations. This can be accomplished, for example, by using a beam splitter. The splitter would split the reflected pulse into multiple pulses, and each pulse would be directed toward a different sensor.

The above embodiment obtains multiple measurements from the same light pulse by using a beam splitter and multiple sensors. An alternative is to obtain one measurement from a light pulse and then repeat the procedure (with a roughly equivalent light pulse) to obtain additional measurements. In this embodiment, the same shuttered sensor can be used for each execution of the procedure, and a beam splitter is not necessary. For each execution, the shuttered sensor is adjusted so that its shutter location is different. In this way, one shuttered sensor can take the place of multiple shuttered sensors. In this embodiment, it is beneficial to ensure that values of factors that can affect the integrated intensity measurement vary slowly over time.

Figure 2:
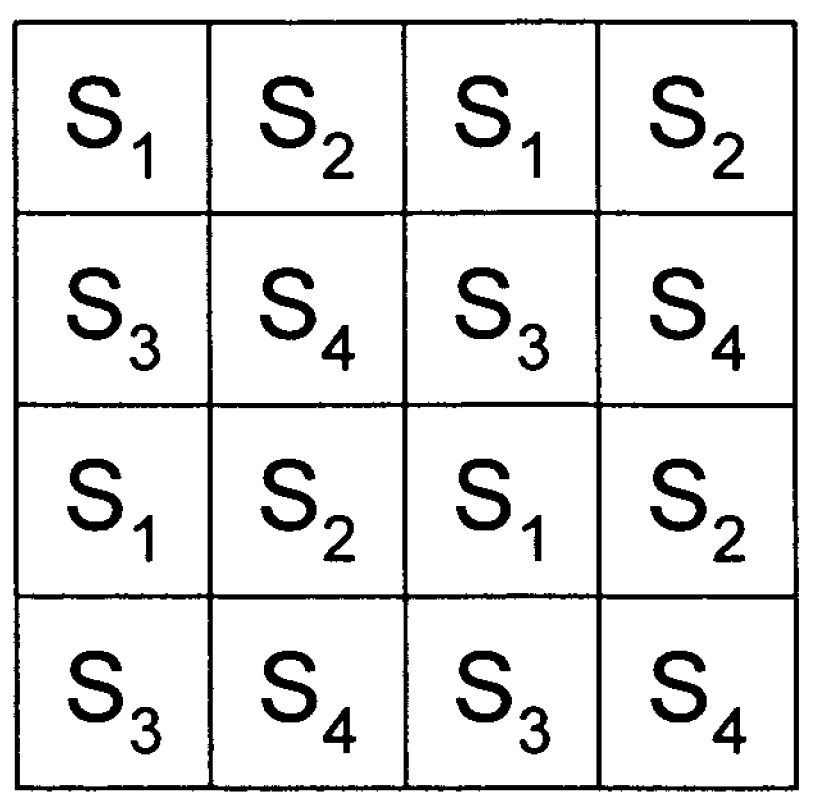

Yet another alternative is to obtain multiple measurements from the same light pulse by using multiple sensors but no beam splitter. In one embodiment, the light pulse can be incident upon a closely-packed set of sensors where each sensor has a different shutter location. FIG. 2 illustrates a block diagram of an arrangement of shuttered sensors that have different shutter locations, according to one embodiment of the invention. The illustrated embodiment shows sixteen shuttered sensors, arranged in a tight four-by-four square. A sensor can have one of four shutter locations: $S_1$, $S_2$, $S_3$, or $S_4$. In the illustrated embodiment, a sensor with a particular shutter setting (such as $S_4$) is surrounded by sensors with different shutter settings (such as $S_1$, $S_2$, and $S_3$).

Even though a sensor has only one shutter location (such as $S_4$), an integrated intensity measurement for a different shutter location (such as $S_1$) can be determined for that sensor by interpolating measurements from nearby sensors that have that shutter location. This is because nearby sensors sample (e.g., sense) light that has reflected off of object points that are in close proximity to each other. In this way, multiple measurements can be obtained from the same light pulse by using multiple sensors without using a beam splitter. This embodiment works well when the depth of a scene varies smoothly. Although the illustrated embodiment shows sixteen shuttered sensors arranged in a four-by-four square, other embodiments are possible, including different numbers of sensors, different arrangements, and different numbers of possible shutter locations.

This interpolation technique is similar to using a Bayer filter, where a color measurement (e.g., red, green, or blue)

is determined for a pixel based on the color measurements of nearby pixels. Bayer filters are known to those of ordinary skill in the art and are further described in U.S. Pat. No. 3,971,065.

In yet another embodiment, a system can use a plurality of the above-mentioned techniques in order to obtain a plurality of integrated intensity measurements from a plurality of shutter locations. For example, the system can be used to execute a procedure more than once, have a beam splitter that directs light to additional shuttered sensors, and/or interpolate measurements from nearby sensors.

Once the desired measurements have been obtained, either Equation 1 or Equation 2 can be used to determine the depth of the object (r). The integrated intensity measurements are substituted for $I_1, I_2, \ldots, I_n$ (in Equation 1) or Y (in Equation 2). Depending on the number of shutter locations, the necessary calculations can include addition and multiplication (to determine the first and second linear combinations) and division (to determine the ratio between the first and second linear combinations).

In one embodiment, a computing module performs the steps of addition, multiplication, and division. A computing module comprises a device that can perform arithmetic computation, including addition, multiplication, and division. Examples of computing modules include general-purpose computers, microprocessors, and solid-state devices (such as CMOS light sensors). In one embodiment, the calculations are distributed among several computing modules. For example, a CMOS light sensor performs calculations using measurements obtained from that sensor and nearby sensors. In this embodiment, calculations can be performed by several different sensors in parallel.

3. Calibration

As described above, a and b represent, respectively, $[a_1, a_2, \ldots, a_n]$ (a first row-vector of calibration parameters for n shutter locations) and $[b_1, b_2, \ldots, b_n]$ (a second row-vector of calibration parameters for n shutter locations). In order to determine the values of a and b, the system described above (including a light emitter and a shuttered light sensor) is used to collect calibration data; namely, Y (a row-vector of integrated intensity measurements from n shutter locations $[I_1, I_2, \ldots, I_n]$,) for an object at a known depth (r). Once Y and r are known, the only remaining variables in Equation 2 are a and b.

Returning to Equation 1, it can be manipulated as follows:

$r(b_0+b_1I_1+b_2I_2+\ldots+b_nI_n)=a_0+a_1I_1+a_2I_2+\ldots a_nI_n$ $r\ b_0+r(b_1I_1+b_2I_2+\ldots+b_nI_n)=a_0+a_1I_1+a_2I_2+\ldots a_nI_n$ $r\ b_0=(a_0+a_1I_1+a_2I_2+\ldots a_nI_n)-r(b_1I_1+b_2I_2+\ldots+b_nI_n)$ At this point, the condition $\|(a, b)\|=1$ can be enforced, and a homogeneous system of equations can be solved to obtain a and b from the calibration data. This can be accomplished by using, for example, singular value decomposition.

Alternatively, since any multiple of [a, b] will produce the same result for the above equation, $b_0$ can be set equal to 1, and the following equation can be obtained:

$r=(a_0+a_1I_1+a_2I_2+\ldots a_nI_n)-r(b_1I_1+b_2I_2+\ldots+b_nI_n)$

Using row-vector notation, this last equation can be expressed as:

$r=a\cdot[1, Y]-r([b_1, b_2, \ldots, b_n]\cdot Y)$ (Equation 3)

Equation 3 represents a piece of calibration data (Y, integrated intensity measurements) obtained from one imaging condition ("calibration setup") with an object depth of r. For a calibration setup j, Equation 3 is expressed as:

$r_j=a\cdot[1, Y_j]-r_j([b_1, b_2, \ldots, b_n]\cdot Y_j)$

If calibration data were obtained from m calibration setups, a vector of known depths $r=[r_1, r_2, \ldots, r_m]$ would be obtained, where one depth $r_j$ is associated with one calibration setup. There would also be m pieces of calibration data (Y), where one set $Y_j$ is associated with one calibration setup. Together, these m pieces of calibration data form a calibration dataset. (A procedure for obtaining a calibration dataset will be discussed below.)

If m is greater than 1 (i.e., if measurements were obtained using multiple calibration setups), then equation 3 can be rewritten as follows:

$$r = \begin{bmatrix} 1 & Y_1 & -r_1Y_1 \\ 1 & Y_2 & -r_2Y_2 \\ 1 & Y_3 & -r_3Y_3 \\ \vdots & \vdots & \vdots \\ 1 & Y_m & -r_mY_m \end{bmatrix} \begin{bmatrix} a_o \\ \vdots \\ a_n \\ b_1 \\ \vdots \\ b_n \end{bmatrix}$$

Note that the second matrix on the right-hand side of the equation is the calibration vector [a, b], arranged as a column vector. If this matrix is called θ and the other matrix is called M, the above equation can be expressed as:

$r=M\theta$ (Equation 4)

Equation 4 may not hold completely true in the presence of uncertainties. Thus, θ is determined by solving Equation 4 in the least-squares sense. Recall that r and M are known. The solution is then given by $\hat{\theta}=M^+r$, where $M^+$ is the pseudo-inverse of M. If $(M^TM)$ is full rank, the solution can be expressed as $\hat{\theta}=(M^TM)^{-1}M^Tr$.

In one embodiment, before a and b are determined, the integrated intensity measurements $I_i$ are normalized so that their average value is 0 and their average absolute value is 1. In another embodiment, the object depths $r_j$ are similarly normalized. In one embodiment, the overall calibration algorithm is as follows:

Input: 1.—Given n independent shutters,
2.—a vector of known depths r of length m,
3.—and corresponding readings $Y_1, \ldots, Y_m$ Output: A parameter vector [a, b] solving Equation 4 in the least-squares sense.

1. $Y_k \leftarrow (Y_k-c_k)/s_k \forall k=1,2,\ldots,n$, where $c_k=\text{avg}(Y_k)$ and $s_k=\text{avg}(|Y_k-c_k|)$.
2. $r \leftarrow (r-c_r)/s_r$, where $c_r=\text{avg}(r)$ and $s_r=\text{avg}(|r-c_r|)$.
3. Assemble M as per Equation 4.
4. Compute $M^+$ and evaluate $\hat{\theta}=M^+r$.
5. Evaluate $\hat{r}=M\hat{\theta}$. Discard any row in M yielding an error larger than $\epsilon$ (e.g., $\epsilon=2$).
6. Recompute $M^+$ and evaluate $\hat{\theta}=M^+r$.
7. $(a_0, \ldots, a_n, b_1, \ldots, b_n) \leftarrow \hat{\theta}$.
8. $a_k \leftarrow a_k/s_k$, and $b_k \leftarrow b_k/s_k \forall k=1, \ldots, n$.
9. $a_0 \leftarrow (a_0-\Sigma_1^n a_k c_k)$, and $b_0 \leftarrow (1-\Sigma_1^n b_k c_k)$.
10. $a_k \leftarrow (s_r a_k + c_r b_k) \forall k=0, \ldots, n$.
11. Return [a, b].

Recall that several factors, such as object depth, object albedo, ambient illumination, and shutter imperfections affect the integrated intensity of a reflected beam. Equations 1 and 2 will accurately determine an object's depth if the calibration dataset spans the range of expected observations. If the expected range of the value of a factor is small, then it is possible to use only a few calibration setups to obtain calibration data. If the expected range is large, however, then calibration data should be obtained from calibration setups where several values of this factor are used that fall within the expected range of observation.

It can be very time-consuming to obtain calibration data from calibration setups that exhibit several values for one factor. An alternative is to use algebraic cancellation to eliminate the effects of that factor in Equations 1 or 2. For example, ambient illumination adds a bias to the power (photons per second) incident to each shuttered sensor. Since this bias is constant for each shuttered sensor that samples the same point in the scene, the bias can be cancelled by subtracting the weighted readings from two shuttered sensors, where the weights are given by the shutter durations. Consider two shutter locations with readings $\hat{I}_1$ and $\hat{I}_2$ and durations $T_1$ and $T_2$. The quantity $I_2'$, which is a weighted average of $\hat{I}_1$ and $\hat{I}_2$, can be defined as follows:

$I_2' \equiv T_1\hat{I}_2 - T_2\hat{I}_1$. Then, $I_2' \approx T_1 T_2[(I_2/T_2 + \text{bias}) - (I_1/T_1 + \text{bias})] = T_1 T_2(I_2/T_2 - I_1/T_1),$ where $I_1$ and $I_2$ are the idealized sensor readings (i.e., without the bias effect). Note that in the last equation, the value of $I_2'$ is independent of the ambient illumination bias.

A similar calculation for a third shuttered sensor yields the following equation: $I_3' \equiv T_1 T_3(I_3/T_3 - I_1/T_1)$. Note that the value of $I_3'$ is also independent of the ambient illumination bias. These values for $I_2'$ and $I_3'$ can now be substituted into Equations 1 or 2. This substitution yields a reduced-order shutter system. In other words, a shutter system with three shutter locations can be treated as a shutter system with only two shutter locations, thereby reducing the need for calibration data.

Similar algebraic cancellations can be used to remove other factors that affect, in a reversible way, shuttered sensors that sample the same scene point.

A. Calibration Procedure

In one embodiment, a calibration dataset is obtained as follows: A planar object printed with a black-and-white checkerboard pattern is used as the target. The object is placed at a known depth (r), and integrated intensity measurements are obtained from the n shutter locations ($I_1$, $I_2$, ..., $I_n$). This same procedure is then repeated one or more times. Each time, the calibration setup can have varying values for one or more of the above factors. While a calibration dataset can be based on calibration setups that exhibit as few as two values for a factor, it is beneficial if the calibration dataset is based on setups that exhibit several values that fall within the expected range of observation for each factor. Using object depth as an example, calibration setups might have the object placed at a plurality of known depths [$r_1$, $r_2$, ..., $r_m$]. In one embodiment, a working volume of one meter is covered by eleven depths that are spaced 10 cm apart.

A pixel that corresponds to a part of the object is observed using a plurality of shutter locations. These observations form an observation vector Y, which is used as a row of constraint matrix M in Equation 4. In general, an object in a calibration setup corresponds to thousands of pixels, while only a few shutter locations are used. As a result, constraint matrix M is generally tall and narrow, which constrains the solution space of [a, b].

4. Additional Embodiments

Usually, in order to account for the effects of two factors on integrated intensity, two additional shutter locations are necessary. In one embodiment, however, one additional shutter location can be used to account for the effects of both ambient illumination and light scattering due to imperfections in a shutter's closed state. In this embodiment, sensors are shuttered so that their shutter durations are equal. In this embodiment, the effects of ambient illumination and shutter imperfections are indistinguishable, and there is no need for a second additional shutter location.

Although the invention has been described in considerable detail with reference to certain embodiments thereof, other embodiments are possible as will be understood to those skilled in the art. For example, another embodiment is described in "Computing Depth Under Ambient Illumination Using Multi-Shuttered Light" by H. González-Baños and J. Davis, Proceedings of the 2004 IEEE Computer Society Conference on Computer Vision and Pattern Recognition (CVPR), Washington, D.C., Jun. 27–Jul. 2, 2004, pp. 234–241, which is hereby incorporated by reference.

What is claimed is:

1. A method for determining a distance to an object, the method comprising calculating the distance d in accordance with the equation:

$$d = \frac{a_0 + a_1 I_1 + a_2 I_2 + \ldots a_n I_n}{b_0 + b_1 I_1 + b_2 I_2 + \ldots b_n I_n},$$

wherein $a_0$ represents a first calibration bias, $b_0$ represents a second calibration bias, $I_i$ represents a measurement of integrated intensity of light associated with a shutter location i, $a_i$ represents a first calibration parameter for the shutter location i, and $b_i$ represents a second calibration parameter for the shutter location i and where i=1, 2, ..., n.

2. The method of claim 1, further comprising obtaining a plurality of measurements of integrated intensity of light prior to calculating the distance.

3. The method of claim 2, wherein obtaining the plurality of measurements of integrated intensity of light comprises using a shuttered sensor.

4. The method of claim 3, wherein the shuttered sensor comprises a physical barrier.

5. The method of claim 3, wherein the shuttered sensor comprises a time-gated sensor.

6. The method of claim 2, wherein obtaining the plurality of measurements of integrated intensity of light comprises splitting a beam of light.

7. The method of claim 2, wherein obtaining the plurality of measurements of integrated intensity of light comprises adjusting, over time, a shutter location of a sensor.

8. The method of claim 2, wherein obtaining the plurality of measurements of integrated intensity of light comprises interpolating measurements from a plurality of sensors.

9. The method of claim 8, wherein interpolating measurements from the plurality of sensors comprises interpolating measurements from a plurality of sensors that sample scene points that are in close proximity.

10. A system for determining a distance to an object, the system comprising means for calculating the distance d in accordance with the equation:

$$d = \frac{a_0 + a_1 I_1 + a_2 I_2 + \ldots a_n I_n}{b_0 + b_1 I_1 + b_2 I_2 + \ldots b_n I_n},$$

wherein $a_0$ represents a first calibration bias, $b_0$ represents a second calibration bias, $I_i$ represents a measurement of integrated intensity of light associated with a shutter location i, $a_i$ represents a first calibration parameter for the shutter location i, and $b_i$ represents a second calibration parameter for the shutter location i and where i=1, 2, . . . , n.

11. The system of claim 10, further comprising means for obtaining a plurality of measurements of integrated intensity of light prior to calculating the distance.

* * * * *